Jan. 5, 1926.  1,568,235
J. MOREAU
POTATO DIGGER
Filed August 9, 1924    3 Sheets-Sheet 1
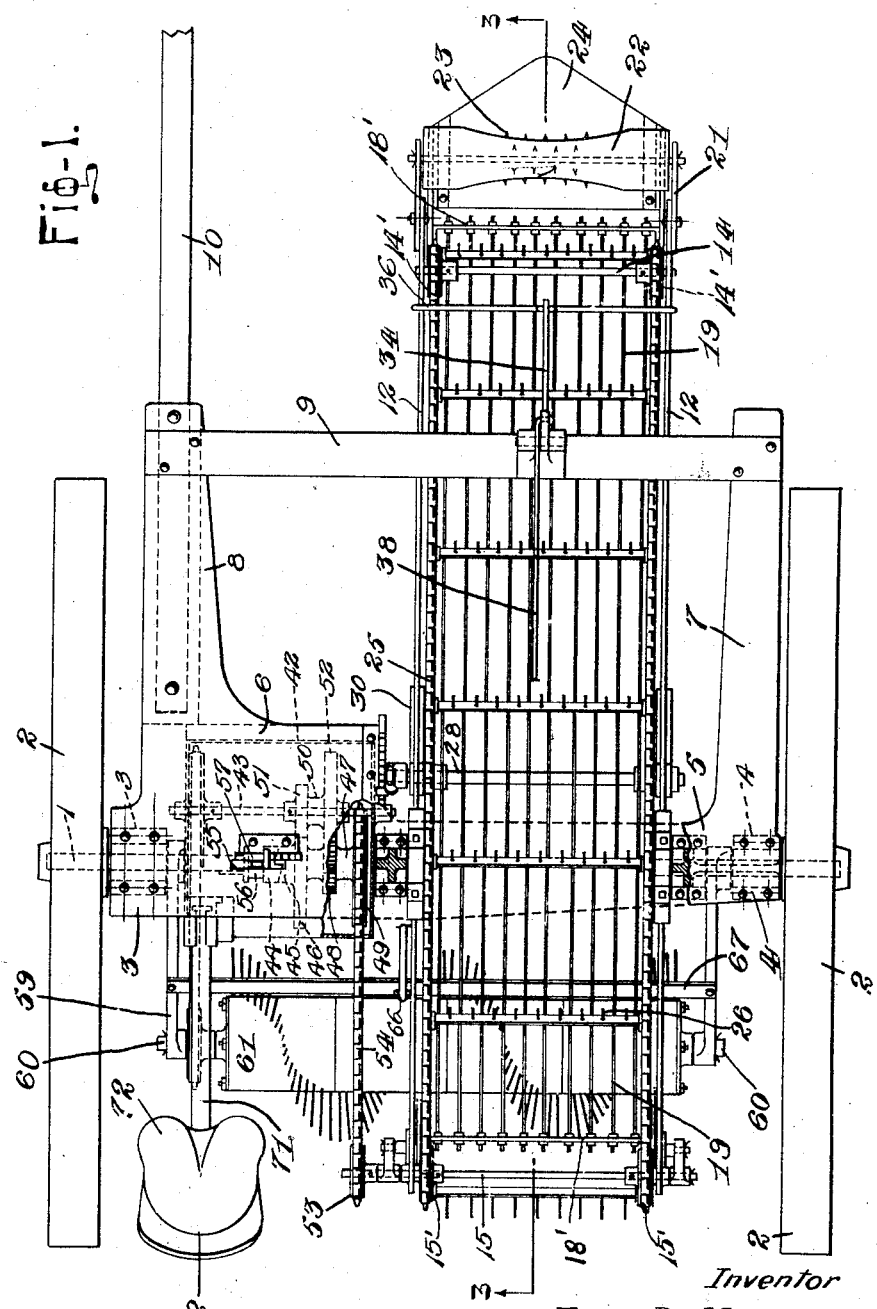
Inventor
Joseph Moreau
By William Clinton
Attorney Jan. 5, 1926.  
J. MOREAU  
POTATO DIGGER  
Filed August 9, 1924  
1,568,235  
3 Sheets-Sheet 2
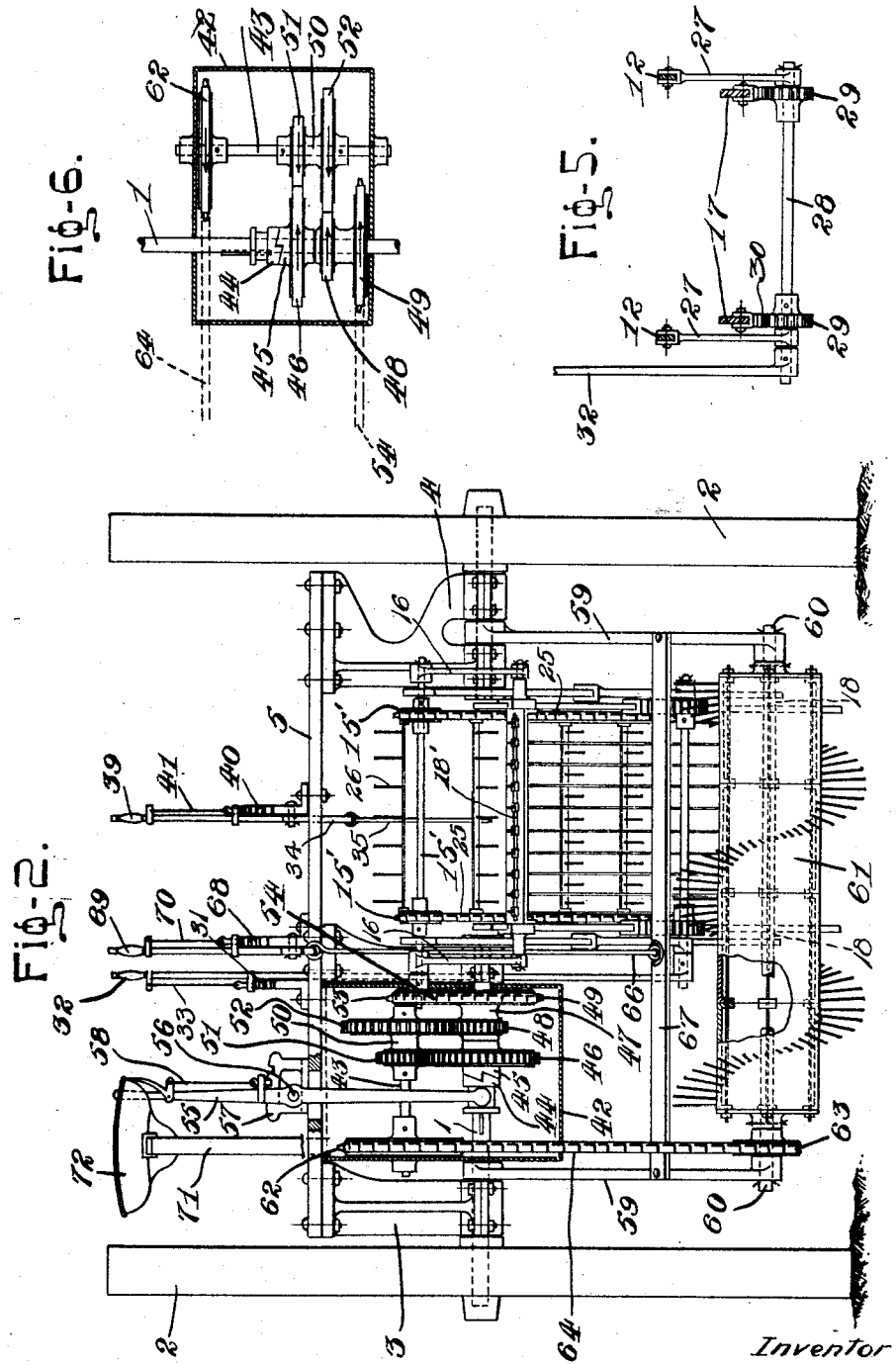
Inventor
Joseph Moreau
By William C. Linton
Attorney

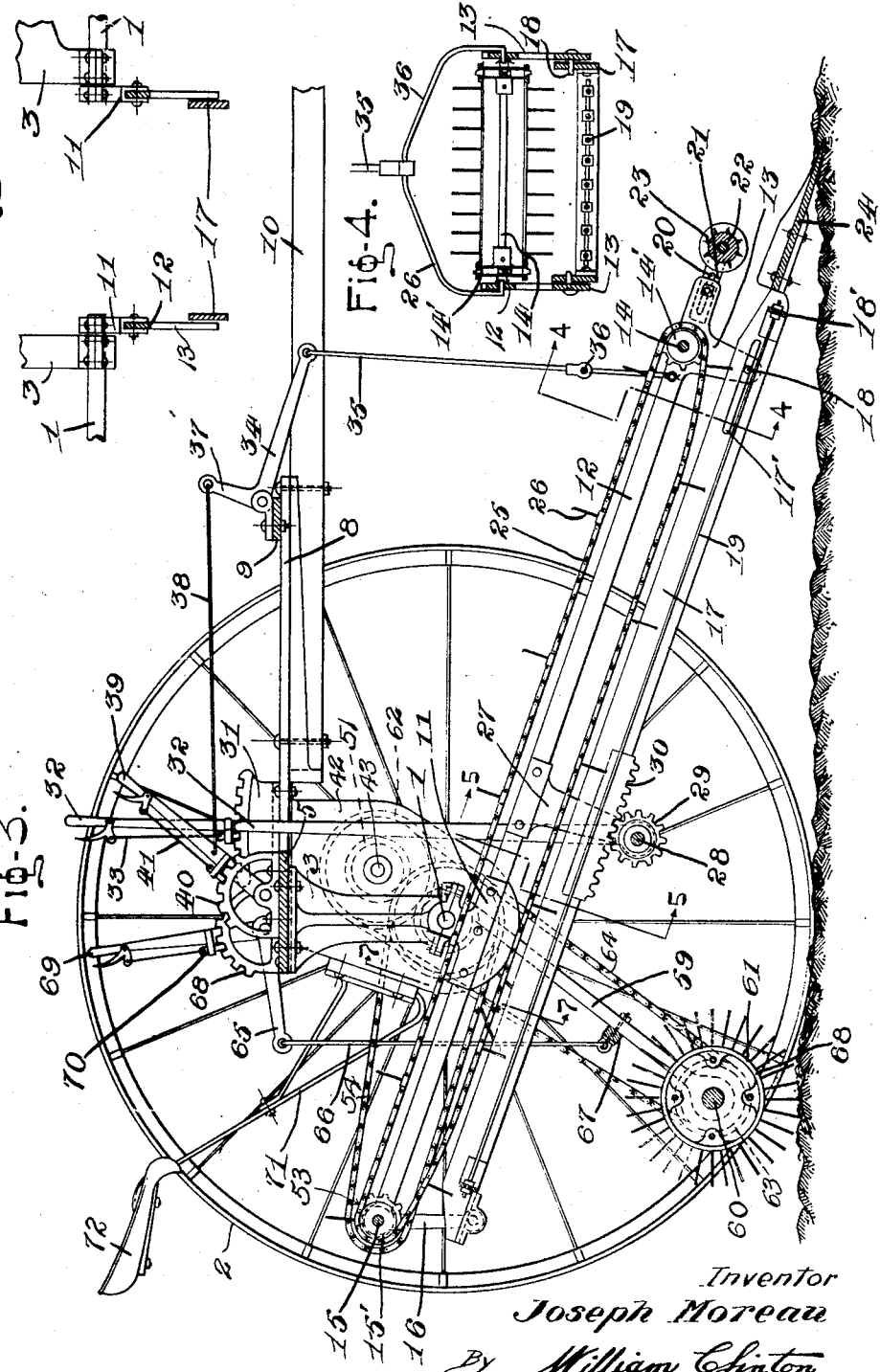

Patented Jan. 5, 1926.

1,568,235

UNITED STATES PATENT OFFICE.

JOSEPH MOREAU, OF MONTREAL, QUEBEC, CANADA.

POTATO DIGGER.

Application filed August 9, 1924. Serial No. 731,083.

*To all whom it may concern:*

Be it known that I, JOSEPH MOREAU, subject of the King of Great Britain, residing at Montreal, in the Province of Quebec, Canada, have invented certain new and useful Improvements in Potato Diggers; and I do hereby declare that the following is a full, clear, and exact description of the invention, such as will enable others skilled in the art to which it appertains to make and use the same.

The present invention pertains to a novel potato digger, the principal object of which is the provision of a device of this character so constructed that the potatoes, separated from the dirt and plants, are swept to one side of the machine, thus forming an elongated row or pile.

This mode of operation distinguishes the present invention from the devices hitherto used in which the potatoes are delivered from the digger without being separated from the dirt and plants. In order to accomplish this function, the device comprises a chute extending longitudinally of the vehicle and carrying at its forward end a scoop or shovel adapted to enter the earth. This device brings the material upon the chute, the bottom of which is substantially open, consisting merely of a number of spaced bars so arranged as to permit the potatoes and dirt to fall therethrough, and to retain the plants. Over the chute moves a rack chain for carrying the material therealong and separating the potatoes from the roots, thereby allowing the potatoes to drop through the bottom of the chute and upon the ground. The plants are carried to the rear end of the chute and discharged therefrom.

Beneath the chute, and in advance of the rear end thereof is supported a roller extending transversely of the vehicle and carrying a spiral train of bristles. These bristles engage the potatoes which have fallen from the chute to the ground and shift them to one side of the vehicle so that a row or pile is formed following the path of the vehicle.

The invention further includes adjustments for regulating the penetration of the scoop into the earth, entirely removing the scoop from the earth, and removing the roller also from engagement with the earth.

The invention is fully disclosed in the following description and in the accompanying drawings in which:

Figure 1 is a plan section;
Figure 2 is a rear elevation;
Figure 3 is a section on the line 3—3 of Figure 1;
Figure 4 is a section on the line 4—4 of Figure 3;
Figure 5 is a section on the line 5—5 of Figure 3;
Figure 6 is an elevation of the transmission box, the side being removed; and,
Figure 7 is a section on the line 7—7 of Figure 3.

Reference will now be made to these views by means of like characters which are employed to designate corresponding parts throughout.

The machine comprises a main shaft 1 supported at its ends within the hubs of the ground wheels 2. The frame of the machine consists of a pair of legs 3 and 4 extending upwardly from the main shaft. Across the tops of the legs is laid the frame top 5, a portion of which is enlarged to form a platform 6 as clearly shown in Figure 1. From the ends of the top extend the side bars 7 and 8 which support the forward bar 9 of the frame. One or both of the side bars may be extended as at 10 to form a draft tongue.

The main shaft 1 carries a pair of spaced clips 11 (Fig. 7) adapted to swing on the shaft and normally inclined as shown in Figure 3. In these clips are secured a pair of elongated bars 12, the forward ends of which are provided with depending arms 13. In the ends of the bars are journaled shafts 14 and 15, each carrying a pair of sprocket wheels 14' and 15'. From the shaft 15 depend a pair of links 16 which, in conjunction with the arms 13, serve to support a pair of plates 17 which form a chute. The rear ends of this plate are pivoted to the links 16, while the forward ends are formed with slots 17' receiving pins 18 projecting from the arms 13. Transverse bars 18' are extended across the ends of the plates and serve to support a plurality of spaced parallel rods 19 lying longitudinally of the plates 17.

The forward extremities of the bars 12 are slotted as at 20 for the adjustable attachment of arms 21. The latter members have journaled therebetween a roller 22 having a concave surface and carrying prongs 23. The forward ends of the chute plates 17 have bolted thereto a shovel or scoop 24 lying beneath the roller 22 and adapted to enter the ground as shown in Figure 3.

Over the sprocket wheels 14' and 15' are trained a pair of parallel chains 25 carrying transverse rakes 26 lying in planes perpendicular to that defined by the chains. To the bars 12 are secured arms 27, which extend downwardly beyond the plates 17 as shown in Figures 3 and 5. Through these arms is passed a rotatable shaft 28 carrying a pair of pinions 29 adapted to mesh with racks 30 carried at the lower edges of the plates 17. A rack 31 is mounted on the platform 6 and is adapted to hold in various positions a lever 32 having one end keyed to the shaft 29 and the remaining end provided with a pawl 33 cooperating with the rack. To the forward bar 9 is pivoted a bell crank lever, one arm 34 of which is connected by means of a link 35 to a yoke 36 having its ends fixed in the forward ends of the bars 12 as shown in Figure 4. From the remaining arm 37 of the bell crank lever extends a link 38 connected to a lever 39 pivoted to the platform as shown in Figure 3. The platform carries a quadrant 40 concentric with the pivot point of the lever and adapted to receive in various positions a pawl 41 carried by the lever. By manipulation of the lever 39 the elevation of the shovel 24 may be regulated, this feature is particularly useful in lifting the shovel entirely out of the earth when the digging is to be interrupted. In this movement the clips 11 turn on the shaft 1 as a pivot.

The lever 32 is actuated to control the penetration of the shovel into the earth. When this lever is moved the pinions 29 cause the chute walls 17 to shift, the forward ends thereof being permitted to move because of their slot and pin engagement with the arms 13, while the rear ends pivot on the links 16.

Beneath the platform 6 is mounted a transmission box 42 which encloses a portion of the main shaft 1 and is inclined slightly to the rear as shown in Figure 3. Within the box is journaled a counter shaft 43 disposed slightly above and forwardly of the main shaft. The main shaft carries a pair of clutch members 44 and 45, the latter carrying a gear 46. Adjacent to the member 45 the shaft is surrounded by a loose sleeve 47 carrying a pinion 48 and a sprocket wheel 49. The shaft 43 has keyed thereto a sleeve 50 carrying a pinion 51 meshing with the gear 46, and a gear 52 meshing with the pinion 48. The inner end of the shaft 15, projecting beyond the sprocket 15', carries a larger sprocket 53 connected to the member 49 by means of a chain 54. In this manner, the chains 25 and rakes 26 are actuated from the main shaft. To the member 44 is pivoted a lever 55, the intermediate part of which carries a pin 56 adapted to move within a rack 57 mounted on the platform 6. The lever also carries a pawl 58 adapted for adjustable engagement with the rack, whereby the clutch may be locked in either close or open position. When the clutch is closed, the sleeve 50 and members 51 and 52 carried thereby are rotated, whereby motion is imparted to the pinion 48, sprocket wheels 49 and 53, chain 54, shaft 15, chains 25 and racks 26. When the clutch is open, this train is broken due to the fact that the member 45 and gear 46 carried thereby are not actuated. From the ends of the shaft 1 depend a pair of hangers 59 adjacent the legs 3 as shown in Figures 3 and 2. Through the lower ends of the hangers is passed a shaft 60 carrying a roller 61 normally disposed slightly above the ground. The surface of this roller carries a spiral train of bristles as clearly illustrated in Figures 1 and 2. The counter shaft 43 and roller shaft 60 carry alined sprocket wheels 62 and 63 respectively over which is trained a sprocket chain 64, whereby the roller is driven from the counter shaft.

A bell crank lever is pivoted upon the platform 6, one end 65 thereof being connected by means of a link 66 to a bar 67 placed transversely across the hangers 59 as shown in Figure 3. Still another quadrant 68 is mounted on the platform concentric with the pivot point of the bell crank lever. The remaining arm 69 of the lever carries a pawl 70 adapted for engagement in the teeth of the quadrant. By means of this device the elevation of the roller may be regulated at will.

To the rear side of the transmission box 42 is secured a bracket 71 which supports the driver's seat 72. It will be seen from Figures 1, 2 and 3 that the levers for adjusting the shovel, chute, clutch and roller are within reach of the driver.

In the operation of the machine various parts having been adjusted as already described, the shovel 24 penetrates the earth and lifts therefrom a quantity of dirt and potato plants. In the forward movement of the machine, this material is engaged by the roller 22 and prongs 23 and carried over to the rods 19. The roller and prongs serve, to some extent, to separate the potatoes from the plant. The separation is completed as the material is carried upwardly along the spaced bars 19 by means of the racks 26. The dirt readily falls between the bars, the space between which is of sufficient size to permit the potatoes also to fall therethrough. The plants however remain upon the bars, and are eventually separated entirely from the potatoes by being constantly struck by the racks. The plant matter is thus carried to the upper end of the chute and discharged therefrom and falls to the rear of the roller 61. The potatoes however fall in front of the roller. The latter member, because of the spiral train of bristles carried thereby, collects the potatoes in a line at one side of the machine specially to the path followed by the driver's seat. In this manner the potatoes are effectively separated from the dirt and foliage and neatly collected in a line or elongated pile, whereby the object of the invention is accomplished.

It should be noted that the draft tongue 10 is located on one side of the machine thereby rendering the latter easier to operate especially when turning.

While a specific embodiment of the invention has been illustrated and described, it is to be understood that various alterations in the details of construction can be made without departing from the spirit of the invention as indicated by the appended claims.

Having thus fully described the invention what I claim as new and desire to protect by Letters Patent is:

1. A potato digger comprising a vehicle frame, a chute supported longitudinally thereof, a scoop carried at the forward end of said chute, the bottom of said chute being constructed to permit the passage of material therethrough, means for carrying material along said chute from the forward to the rear end thereof, and means supported beneath said chute for sweeping material to one side of said vehicle.

2. A potato digger comprising a vehicle frame, a chute supported longitudinally thereof, a scoop carried at the forward end of said chute, the bottom of said chute being constructed to permit the passage of material therethrough, means for carrying material along said chute from the forward to the rear end thereof, and a roller supported beneath said chute and transversely of the vehicle, said roller being provided on its surface with a spiral train of bristles adapted to sweep material to one side of the vehicle.

3. A potato digger comprising a vehicle frame, an inclined chute supported longitudinally thereof, a scoop carried at the forward end of said chute, the bottom of said chute being constructed to permit the passage of material therethrough, means for carrying material along said chute from the forward to the rear end thereof, means for adjusting the inclination of said chute, and means supported beneath said chute for sweeping material to one side of said vehicle.

4. A potato digger comprising a vehicle frame, an inclined chute supported longitudinally thereof, a scoop carried at the forward end of said chute, the bottom of said chute being constructed to permit the passage of material therethrough, means for carrying material along said chute from the forward to the rear end thereof, means for adjusting the inclination of said chute, and a roller supported beneath said chute and transversely of the vehicle, said roller being provided on its surface with a spiral train of bristles adapted to sweep material to one side of the vehicle.

5. A potato digger comprising a vehicle frame, a chute supported longitudinally thereof, the bottom of said chute consisting of a plurality of spaced rods, a scoop carried at the forward end of said chute, means for carrying material along said chute from the forward to the rear end thereof, and means supported beneath said chute for sweeping material to one side of said vehicle.

6. A potato digger comprising a vehicle frame, an inclined chute supported longitudinally thereof, the bottom of said chute consisting of a plurality of spaced rods, a scoop carried at the forward end of said chute, a pair of movable chains supported over said chute, rakes carried by said chains and adapted to enter said chute, and means supported beneath the chute for sweeping material to one side of the vehicle.

7. A potato digger comprising a vehicle frame, a chute supported longitudinally thereof, the bottom of said chute consisting of a plurality of spaced rods, a scoop carried at the forward end of said chute, means for carrying material along said chute from the forward to the rear end thereof, and a roller supported beneath said chute and extending transversely of the vehicle and a spiral train of bristles carried by said roller for sweeping material to one side of the vehicle.

8. A potato digger comprising a vehicle frame, an inclined chute supported longitudinally thereof, the bottom of said chute consisting of a plurality of spaced rods, a scoop carried at the forward end of said chute, a pair of movable chains supported over said chute, rakes carried by said chains and adapted to enter said chute, and a roller supported beneath said chute and extending transversely of the vehicle and a spiral train of bristles carried by said roller for sweeping material to one side of the vehicle.

9. A potato digger comprising a vehicle frame, a chute supported longitudinally thereof, the bottom of said chute consisting of a plurality of spaced rods, a scoop carried at the forward end of said chute, means for carrying material along said chute from the forward to the rear end thereof, and means supported beneath said chute for sweeping material to one side of said vehicle, and means for varying the inclination of said chute.

10. A potato digger comprising a vehicle frame, an inclined chute supported longitudinally thereof, the bottom of said chute consisting of a plurality of spaced rods, a scoop carried at the forward end of said chute, a pair of movable chains supported over said chute, rakes carried by said chains and adapted to enter said chute, means supported beneath the chute for sweeping material to one side of the vehicle, and means for varying the inclination of said chute.

11. A potato digger comprising a vehicle frame, a chute supported longitudinally thereof, the bottom of said chute consisting of a plurality of spaced rods, a scoop carried at the forward end of said chute, means for carrying material along said chute from the forward to the rear end thereof, and a roller supported beneath said chute and extending transversely of the vehicle and a spiral train of bristles carried by said roller for sweeping material to one side of the vehicle, means for varying the inclination of said chute and means for varying the altitude of said roller.

12. A potato digger comprising a vehicle frame, an inclined chute supported longitudinally thereof, the bottom of said chute consisting of a plurality of spaced rods, a scoop carried at the forward end of said chute, a pair of movable chains supported over said chute, rakes carried by said chains and adapted to enter said chute, and a roller supported beneath said chute and extending transversely of the vehicle and a spiral train of bristles carried by said roller for sweeping material to one side of the vehicle, means for varying the inclination of said chute and means for varying the altitude of said roller.

13. A potato digger comprising a vehicle frame, a chute supported longitudinally thereof, a scoop carried at the forward end of said chute, the bottom of said chute being constructed to permit the passage of material therethrough, means for carrying material along said chute from the forward to the rear end thereof, means supported beneath said chute for sweeping material to one side of said vehicle, and means for shifting said chute longitudinally.

14. A potato digger comprising a vehicle frame, a chute supported longitudinally thereof, a scoop carried at the forward end of said chute, the bottom of said chute being constructed to permit the passage of material therethrough, means for carrying material along said chute from the forward to the rear end thereof, a roller supported beneath said chute and transversely of the vehicle, said roller being provided on its surface with a spiral train of bristles adapted to sweep material to one side of the vehicle, and means for shifting said chute longitudinally.

15. A potato digger comprising a vehicle frame, an inclined chute supported longitudinally thereof, the bottom of said chute consisting of a plurality of spaced rods, a scoop carried at the forward end of said chute, a pair of movable chains supported over said chute, rakes carried by said chains and adapted to enter said chute, and a roller supported beneath said chute and extending transversely of the vehicle and a spiral train of bristles carried by said roller for sweeping material to one side of the vehicle, means for varying the inclination of said chute, means for varying the altitude of said roller, and means for shifting said chute longitudinally.

In witness whereof I have hereunto set my hand.

JOSEPH MOREAU.